Patented Oct. 9, 1962

3,057,809
FLEXIBLE EPOXY RESIN COMPOSITIONS AND CURED PRODUCTS
Herbert A. Newey, Lafayette, Calif., assignor to Shell Oil Company, New York, N.Y., a corporation of Delaware
No Drawing. Filed July 14, 1959, Ser. No. 826,906
13 Claims. (Cl. 260—18)

This invention relates to epoxy resin compositions. More particularly, the invention relates to epoxy resin compositions having improved flexibility and impact strength and to the cured products obtained therefrom.

Specifically, the invention provides new epoxy resin compositions having outstanding flexibility and impact strength which comprise (1) a polyether polyepoxide having a vic-epoxy equivalency greater than one and preferably a glycidyl ether of a polyhydric phenol, and (2) at least 10% by weight of an epoxy ester of a polycarboxylic acid containing at least 8 carbon atoms and preferably a glycidyl ester of a dimerized or trimerized unsaturated fatty acid. The invention further provides cured products obtained by reacting the above-described compositions with an epoxy curing agent.

This application is a continuation-in-part of my co-pending application Serial No. 666,238, filed June 17, 1957, now U.S. Patent No. 2,940,986.

Polyepoxides, such as, for example, those obtained by reacting epichlorohydrin with polyhydric phenols in the presence of caustic are promising materials for use in preparing industrial products as they may be cured to form resins which are very hard and durable and have good resistance to chemicals. These polyepoxides, however, have certain undesirable characteristics which have greatly limited their industrial application. These materials, for example, have rather poor flexibility and this limits their use in application such as in foams, adhesives, coatings, pottings, metal forming dyes, mastics, and the like, where some flexibility and distensibility are required. The exact amount of flexibility will vary with the application. In some cases only enough elongation is needed to follow a rigid substrate during suspension and retraction. In other applications flexibility approaching that of rubber is desired. Some efforts have been made in the past to correct this defect by modifying the epoxide with various components, such as linear polysulfide polymers, amino-amides, and long-chain aliphatic diamines. While these compositions have been used with some degree of success, the product still falls short of the strength and flexibility desired for many applications.

It is, therefore, an object of the invention to provide new polyepoxide compositions. It is a further object to provide new polyepoxide compositions having improved flexibility and good impact strength. It is a further object to provide a new polyepoxide composition that gives products having outstanding flexibility and impact strength which is not lost upon aging. It is a further object to provide new compositions containing glycidyl polyethers of polyhydric phenols which have low viscosity and can be cured to form highly flexible products. It is a further object to provide new epoxy compositions which are particularly useful for preparing foams. It is a further object to provide compositions containing glycidyl ethers of polyhydric phenols which can be used to form flexible pottings, coatings and the like. Other objections and advantages of the invention can be apparent from the following detailed description thereof.

It has now been discovered that these and other objects of the invention may be accomplished by the compositions of the invention which comprise a mixture of (1) a polyether polyepoxide having a vic-epoxy equivalency of greater than 1.0 and (2) at least 10% by weight of epoxy ester of a polycarboxylic acid containing at least 8 carbon atoms and preferably a glycidyl ester of a dimerized or trimerized fatty acid. It has been unexpectedly found that these particular compositions can be cured to form resinified products having surprisingly high flexibility and impact strength and these properties are permanent and not lost after exposure to air and high temperatures.

In addition, it has been found that in contrast to the prior compositions producing flexible products, the products have much lower viscosities and require the use of less solvents and diluents in the preparation of coatings and the like. The new compositions also have been found to have excellent adhesion and chemical resistance and can be utilized in all applications where the polyepoxides by themselves have been found to be useful.

The new compositions have been found to be particularly useful in the preparation of electrical pottings. In this application the electrical component, such as electrical motor, is entirely embedded in the resin. This avoids any necessity of using special means to protect the windings and motor parts from liquids, etc.

The new compositions are also particularly useful in the preparation of foamed or cellular products. Heretofore the epoxy resins have been too rigid for most foamed products, but the present compositions form cellular products which have a high degree of distensibility. In addition, they can be used in this application without wetting agents as the compositions have unexpected ability to display their own wetting characteristics.

The epoxy esters to be used in making the compositions of the present invention comprise those organic esters which possess more than one vic-epoxy group, i.e., a

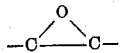

and at least 8 carbon atoms, and preferably 12 to 70 carbon atoms. The esters preferably contain two or more ester groups and especially 2 to 6

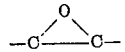

groups. The vic-epoxy groups may be in the acid and/or alcohol portion of the ester molecule and may be terminal or internal groups, i.e., a

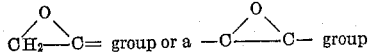

Examples of these epoxy materials comprise the epoxidized polyethylenically unsaturated polycarboxylic acid esters, such as, for example, dimethyl 8, 9, 12, 13-diepoxyeicosanedioate, dibutyl-7, 8, 11, 12-diepoxyoctadecanedioate, dioctyl 10, 11-diethyl-8-9, 12, 13-diepoxyeicosanedioate, dihexyl 6, 7, 10, 11-diepoxyhexadecanedioate, didecyl 8 - epoxyethyl - 10,11 - epoxyoctadecene-dioate, dibutyl 3-butyl-3, 4, 5, 6-diepoxycyclohexane-1,2-dicarboxylate, dibenzyl 1,2,4,5-diepoxycyclohexane-1,2-dicarboxylate, diethyl-3-acetoxy-1,2,4,5-diepoxycyclohexane-1,2-dicarboxylate and diethyl 5,6,10,11-octadecylsuccinate. Especially preferred are the epoxidized dialkyl esters of polyethylenically unsaturated aliphatic and cycloaliphatic dicarboxylic acids, and especially those containing from 8 to 30 carbon atoms.

Another group of epoxy materials includes the esters of epoxy alcohols and epoxy carboxylic acids, such as, for example, tri(2,3-epoxypropyl)epoxyaconitate, di(2,3-epoxypropyl) 4,5 - epoxycyclohexane - 1,2 - carboxylate, tri(2,3 - epoxypropyl)epoxyitaconate, di(2 - methyl - 2,3 - epoxypropyl) 4,5 - epoxycyclohexane - 1,2 - dicarboxylate, di(3,4 - epoxybutyl) 3,6 - dimethyl - 4,5 - epoxycyclo - hexane - 1,2 - dicarboxylate, di(2,3 - epoxypropyl) 2,3 - epoxy - octadecylsuccinate, di(5,6 - epoxyhexyl) 3,4,5,6 - diepoxycyclohexane - 1,2 - dicarboxylate, di(3,4 - epoxy - hexyl) 2,3 - epoxyhexadecylsuccinate, 2,3 - epoxypropyl allyl 4,5-diepoxycyclohexane-1,2-dicarboxylate, di(2,3-epoxypropyl) - 3 - chloro - 4,5 - epoxycyclohexane - 1,2 - dicarboxylate, di(3,4-epoxyhexyl) 8, 9, 12-13-diepoxy-eicosanedioate and di(3,4-epoxypentyl) 7, 8, 11, 12-diepoxyoctadecanedioate.

Another group comprises the esters of polyhydric alcohols and epoxy-substituted monocarboxylic acids, such as, for example, glycerol tri(8,9-epoxydodecanoate), glycerol 10, 11-epoxyoctadecaneoate, epoxidized triglycerides, such as epoxidized soybean oil, sardine oil, cottonseed oil and the like.

Another group and especially preferred group are the esters of epoxy-substituted alcohols and polycarboxylic acids, such as diglycidyl adipate, diglycidyl succinate, diglycidyl dodecanedioate, diglycidyl octadecanedioate, diglycidyl 1,20-eicosanedioate, diglycidyl 1,18-eicosanedioate, and the glycidyl esters of polymerized unsaturated fatty acids, such as the dimerized and trimerized fatty acids obtained by heat polymerization of fatty acids under known conditions, such as dimerized and trimerized linoleic acid, linolenic acid, eleostearic acids and licannic acids.

Particularly preferred because of the rapid cure obtained therewith and the particularly superior properties of the resulting products are those wherein the epoxy groups are in terminal positions, i.e., have the structure

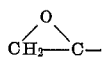

such as the above-noted glycidyl esters. In addition, the especially preferred esters to be because of the high degree of compatibility obtained therewith are the glycidyl esters of polybasic acids containing from 20 to 70 carbon atoms and especially the dimerized and trimerized fatty acids. These acids are preferably obtained by heating the methyl esters of the acids by the method described in "Industrial and Engineering Chemistry," vol. 38, page 1139 (1946). The structures of the products so obtained are believed to be those given in "Industrial and Engineering Chemistry," vol. 33, page 89 (1941).

The above epoxy esters may be obtained by epoxidizing the corresponding unsaturated esters by the method described in U.S. 2,761,870 or by reacting the acids with chlorohydrins as described in U.S. 2,772,296.

The glycidyl esters of the polycarboxylic acids are preferably obtained by reacting a potassium or sodium salt of the acid with epichlorohydrin in the presence of a tertiary amine alkaline material as described in U.S. 2,448,602. Illustrative examples of the preparation of some of these esters are given below.

*Diglycidyl Ester of Dimerized Linoleic Acid*

90 grams of dimerized linoleic acid were dissolved in benzene and 16.8 parts KOH (19.8 parts of 95% KOH in 15 parts water) stirred into the mixture. The benzene was then distilled off to remove the water. To the dry salt was added 368 parts of epichlorohydrin. The mixture was stirred and heated to 100° C. for ½ hour. The temperature was then maintained at 100° C. to 105° C. for one hour. The salt formed in the reaction (KCL) was filtered off and the excess epichlorohydrin topped off at 110° C. at 1-2 mm. The resulting product was a fluid liquid having an epoxy value of 0.23 eq./100 g., OH value of 0.04 eq./100 g., ester value 0.293.

*Triglycidyl Ester of Trimerized Linoleic Acid*

96 parts of trimer acid (trimerized linoleic acid) was dissolved in 300 parts of benzene and 16.8 parts of KOH (19.8 parts of 85% KOH in 15 parts of water) stirred into the mixture. After stirring for one hour, benzene and water were distilled off leaving solid potassium salt. The salt was broken up and 368 parts of epichlorohydrin added. 1 part of benzene trimethyl ammonium chloride was added as a catalyst. The mixture was heated for 1 hour at 95° C. The mixture was then filtered and the salt washed with benzene. The filtrate was then distilled to remove benzene and excess epichlorohydrin. The resulting product was a liquid having an epoxy value of 0.233 eq./100 g.

*Glycidyl Ester of Dimerized Rosin Acids*

100 parts of dimerized rosin acids (softening point 145–158° C.) was dissolved in ethyl alcohol and benzene. 14.5 parts of KOH was added to the mixture. After stirring for one hour, benzene and water were distilled off leaving solid potassium salt. The salt was mixed with 230 parts of epichlorohydrin and 1 part of benzyl trimethyl ammonium chloride. The mixture was maintained at 100–105° C. for about 1.5 hours. After cooling, the salt was filtered off and the filtrate distilled at 110° C. at 2 mm. to yield a thick liquid identified as the glycidyl ester of the dimerized rosin acids having an epoxy value of 0.221 eq./100 g.

*Glycidyl Ester of Maleic Anhydride-Rosin Adduct*

57 parts of an adduct of methyl abietate and maleic anhydride were combined with 29 parts of 85% KOH in 150 parts of water and refluxed 2 hours. The mixture was neutralized to pH of 8–9 and then water was distilled off. 500 parts of benzene were added and distilled to remove last trace of water. 4 mols of epichlorohydrin were then added and the mixture heated to reflux for one hour. The salt was removed by filtration and the mixture distilled to remove excess epichlorohydrin. The resulting ester had an epoxy value of 0.205 eq./100 g.

*Diglycidyl Ester of 1,20-Eicosanedioic Acid*

100 parts of 1,20-eicosanedioic acid was dissolved in 300 parts of benzene and 85% KOH added to the mixture. After stirring for one hour, benzene and water were distilled off leaving solid potassium salt. The salt was broken up and epichlorohydrin added. 1 part of benzene trimethyl ammonium chloride was added as a catalyst. The mixture was heated for 1 hour at reflux. The mixture was then filtered and the excess epichlorohydrin distilled off. The resulting ester had an epoxy value of 0.405 eq./100 g.

The polyether polyepoxides to be used in preparing the compositions of the present invention include those compounds possessing at least two ether linkages (i.e., —O— linkages) and a plurality of 1,2-epoxy groups

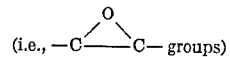

These polyether polyepoxides may be satuated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyether polyepoxides and particularly those of the polymeric type will be described throughout the specification and claims in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyether polyepoxide material consists of a single compound and all of the epoxy groups are intact, the epoxy equivalency will be integers, such as 2,3,4, and the like. However, in the case of polymeric-type polyether polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5 and the like.

Polyether polyepoxides to be used in the process of the invention may be exemplified by 1,4-bis(2,3-epoxypropoxy)benzene, 1,3 - bis(2,3 - epoxypropoxy)benzene, 4,4' - bis(2,3-epoxypropoxy)diphenyl ether, 1,4 - bis(2,3-epoxypropoxy)octane, 1,4 - bis(2,3-epoxypropoxy)cyclohexane, 4,4' - bis(2-hydroxy - 3,4 - epoxybutoxy)diphenyldimethylmethane, 1,3 - bis(4,5 - epoxypentoxy) - 5 - chlorobenzene, 1,4 - bis(3,4 - epoxybutoxy) - 2 - chlorocyclohexane, diglycidyl ether, ethylene glycol diglycidyl ether, resorcinol diglycidyl ether, and 1,2,3,4-tetra(2-hydroxy-3,4-epoxybutoxy)butane.

Other examples include the glycidyl polyethers of polyhydric phenols obtained by reacting a polyhydric phenol with an excess, e.g., 4 to 8 mol excess, of a chlorohydrin, such as epichlorohydrin and dichlorohydrin. Thus, polyether B described hereinafter, which is substantially 2,2-bis(2,3-epoxypropoxyphenyl)propane, is obtained by reacting bis-phenol(2,2 - bis(4 - hydroxyphenyl)propane) with an excess of epichlorohydrin in an alkaline medium. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxybenzophenone, bis(4-hydroxyphenyl)ethane, and 1,5-dihydronaphthalene.

Still a further group of the polyether polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetriol, pentaerythritol, di- and tripentaerythritol, polyglycerol, dulcitol, inositol, carbohydrates, methyltrimethylolpropane, 2,6-octanediol, 1,2,4,5-tetrahydroxycyclohexane, 2-ethylhexanetriol-1,2,-6, glycerol methyl ether, glycerol allyl ether, polyvinyl alcohol and polyallyl alcohol, and mixtures thereof.

Other polyether polyepoxides include the polyepoxy-polyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)-ether, and the reaction product of catechol and bis(2,3-epoxypropyl)ether.

A group of polymeric-type polyether polyepoxides comprises the hydroxy-substituted polyepoxy polyethers obtained by reacting, preferably in an alkaline medium, a slight excess, i.e., .5 to 3 mol excess, of a halogen-containing epoxide, such as epichlorohydrin, with any of the aforedescribed polyhydric phenols, such as resorcinol, catechol, 2,2 - bis(4'-hydroxyphenyl)propane, bis(4-(2'-hydroxynaphth-1-yl) 2 - 2 - hydroxynapth-1-yl) methane and the like.

Other polymeric polyether polyepoxides include the polymers and copolymers of the allylic ether of epoxy-containing alcohols. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These allylic ethers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), allyl 2,3-epoxypropyl ether-styrene copolymer, methallyl 3,4-epoxybutyl ether-allyl benzoate copolymer, poly(vinyl 2,3-epoxypropyl)ether and an allyl glycidyl ether-vinyl acetate copolymer.

Preferred polyether polyepoxides comprise the members of the group consisting of diglycidyl ether, monomeric aliphatic polyepoxides containing a plurality of glycidyl radicals joined through oxygen ether linkages to aliphatic hydrocarbon radicals, monomeric aromatic polyepoxides containing a plurality of glycidyl radicals joined through oxygen ether linkages to mononuclear or polynuclear aromatic radicals, the polyepoxy-containing reaction product of an aliphatic polyhydric alcohol and epichlorohydrin, the polyepoxy-containing polymeric reaction product of an aromatic polyhydric phenol and epichlorohydrin, the polyepoxy-containing reaction product of an aliphatic polyhydric alcohol and a polyepoxide compound, the polyepoxy-containing reaction product of a polyhydric phenol and a polyhydric phenol and a polyepoxide compound, the homo- and copolymers of allylic ethers of epoxy-substituted alcohols prepared in the absense of alkaline or acidic catalysts, and copolymers of the aforedescribed epoxy-containing monomers and at least one monomer containing a $CH_2=C=$ group prepared in the absence of alkaline or acidic catalysts.

The preparation of one of the preferred polyglycidyl ethers of polyhydric alcohols may be illustrated by the following example showing the preparation of a glycidyl polyether of glycerol.

*Preparation of Glycidyl Polyethers of Polyhydric Alcohols*

Polyether A: About 276 parts (3 mols) of glycerol was mixed with 832 parts (9 mols) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was 2.13. For convenience, this product will be referred to hereinafter as polyether A.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Also of importance are the monomeric and polymeric glycidyl polyethers of dihydric phenols obtained by reacting epichlorohydrin with a dihydric phenol in an alkaline medium. The monomeric products of this type may be represented by the general formula

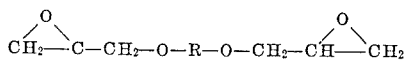

wherein R represents a divalent hydrocarbon radical of the dihydric phenol. The polymeric products will generally not be a single simple molecule but will be a complex mixture of glycidyl polyethers of the general formula

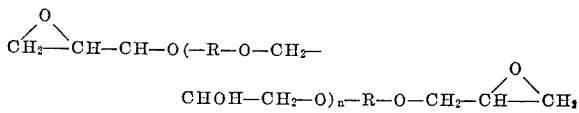

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value of $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of the dihydric phenols will be illustrated below.

*Preparation of Glycidyl Polyethers of Dihydric Phenols*

Polyether B: About 2 mols of bis-phenol was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75. For convenience, this product will be referred to hereinafter as polyether B.

Polyether C: A solution consisting of 11.7 parts of water, 1.22 parts of sodium hydroxide, and 13.38 parts of bis-phenol was prepared by heating the mixture of ingredients to 70° C. and cooling to 46° C. at which temperature 14.06 parts of epichlorohydrin was added while agitating the mixture. After 25 minutes had elapsed, there was added during an additional 15 minutes time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value of 0.40 eq./100 g., and an epoxy equivalency of 1.9. For convenience, this product will be referred to as polyether C.

Polyether D: About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at 130° C. The Durrans' Mercury Method melting point of the resulting product is 52° C. and the molecular weight is about 900. The product has an epoxy value of 0.27 eq./100 g. and an epoxy equivalency of 1.9. For convenience this product will be referred to herein as polyether D.

Particularly preferred members of the above-described group are the glycidyl polyethers of the dihydric phenols, and especially 2,2'-bis(4'-hydroxyphenyl)propane, having an epoxy equivalency between 1.1 and 2.0 and a molecular weight between 300 and 900. Particularly preferred are those having a Durrans' Mercury Method softening point below about 60° C.

The glycidyl polyethers of polyhydric phenols obtained by condensing the polyhydric phenols with epichlorohydrin are also referred to as "ethoxylene" resins. See Chemical Week, vol. 69, page 27, for September 8, 1951.

Of particular value in the process of the invention are the polyepoxides containing only carbon, hydrogen, oxygen and halogen atoms.

The compositions of the invention may be prepared by any suitable method. Usually one or both of the two components are liquids and the compositions may be simply prepared by mixing the two together. If one or more of the components are very thick liquids or solids, it is generally preferred to heat them before or during the mixing. Various solvents or diluents which will evaporate before or during cure may be added to assist in the preparation, but the addition of these materials is not generally desirable as it usually lengthens the time of cure of the finished product. Suitable solvents include hydrocarbons, such as xylene, benzene, petroleum distillates and the like. It is also convenient in some cases to utilize liquid monoepoxy compounds, such as butyl glycidyl ether, phenyl glycidyl ether, amyl glycidyl ether, allyl glycidyl ether and the like, as well as the lower molecular weight liquid epoxy esters, such as glycidyl acetate, glycidyl acrylate, glycidyl butyrate and the like. Other materials which are useful as solvents or diluents include the nitriles, such as acetonitrile, acrylonitrile and the like.

The ratio of the polyether polyepoxide and the epoxy ester in the composition will vary within certain limits depending upon the properties desired in the resulting products. Compositions having improved flexibility and impact strength are obtained when the epoxy ester makes up at least 10% by weight of the mixture, but best results are obtained when the epoxy ester makes up from 20% to 80% by weight of the mixture. Particularly good results are obtained when the epoxy ester makes up from 20% to 70% and the polyether polyepoxide makes up from 80% to 30% by weight of the combined mixture.

Other materials, such as fillers, dyes, plasticizer, stabilizers and the like may be added as desired along with suitable other resinous materials, such as vinyl resins, tars, pitches, distillates, oils, alkyd resins and the like.

The compositions of the invention may be cured by the action of a curing or hardening agent. For this purpose, epoxy curing agents, which may be acidic, neutral or alkaline, are added. Examples of the curing agents include, among others, alkalies like sodium or potassium hydroxide: alkali phenoxides like sodium phenoxide; carboxylic acids or anhydrides, such as phthalic anhydride, tetrahydrophthalic anhydride; dimer or trimer acids derived from unsaturated fatty acids, 1,20-eicosanedioic acid, and the like. Friedel-Crafts metal halides, such as aluminum chloride, zinc chloride, ferric chloride; salts such as zinc fluoborate, magnesium perchlorate, zinc fluosilicate; phosphoric acid and partial esters thereof including n-butyl ortho-phosphate, diethyl ortho-phosphate and hexaethyltetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperzine, N,N-dibutyl-1,3-propane diamine, N,N-diethyl-1,3-propane diamine, 1,2-diamino-2-methyl-propane, 2,3-diamino-2-methylbutane, 2,4-diamino-2-methylpentane, 2,4-diamino-2,6-diethyloctane, dibutylamine, dioctylamine, dionylamine, distearylamine, diallylamine, dicyclohexylamine, methylethylamine, ethylcyclohexylamine, pyrrolidine, 2-methylpyrrolidine, tetrahydropyridine, 2,6-diaminopyridine, meta-phenylene diamine, and the like, and soluble adducts of amines and polyepoxides and their salts, such as described in U.S. 2,651,589 and U.S. 2,640,037. Also included are the amino-amides obtained by reacting polybasic acids with polyamines.

Preferred curing agents are the polycarboxylic acids and their anhydrides, the primary and secondary aliphatic, cycloaliphatic, aromatic and heterocyclic amines, and preferably the polyamines and adducts of amines and epoxides.

The amount of the curing agent employed will vary depending upon the type of agent selected. In general, the amount of the curing agent will vary from about 0.5% to 200% by weight of the combined mixture of epoxy ether and epoxy ester. The tertiary amines and $BF_3$ complexes are preferably employed in amounts varying from about 0.5% to 20% and the metal salts are preferably employed in amounts varying from about 1% to 15%. The secondary and primary amines, acids and anhydrides are preferably employed in at least .6 equivalent, an equivalent amount being that sufficient to furnish one active hydrogen atom or carboxyl group or anhydride group for every epoxy group. Such combinations are preferably combined in equivalent ratios (curing agent to epoxy) which vary from about .6:1 to 1.5:1.

The curing of the above-described compositions to form the desired insoluble infusible products may be accomplished by merely mixing the above-noted curing agents in the desired amounts with the compositions of the present invention. The most active curing agents, such as the polyamines as diethylene triamine, are reactive at room temperature and application of heat is not necessary to effect the cure. Other agents, such as the aromatic polyamines are not quite as active at the lower temperatures and it is desirable to apply heat to speed cure. Temperatures employed will vary from about 30° C. to as high or higher than 250° C.

The compositions of the invention may be utilized for a variety of applications. Because of their improved flexibility and impact resistance when cured, the compositions are ideally suited for use in preparing coating compositions, foams, pottings, castings, adhesives, impregnating compositions for cloth and paper, and the like.

When used for coating compositions, the new compositions of the invention may be mixed with solvents or diluents, additives, such as plasticizers, stabilizers and extenders such as oils, resins, tars, pitches, distillates and the like, and then combined with the desired curing agent. The coatings prepared in this manner may be allowed to set hard at room temperature or heat may be applied to hasten the cure.

The products of the invention may also be used in preparing pottings and castings for electrical apparatus. In actual practice, the compositions are generally combined with the desired curing agent and the mixture poured into the mold or casting containing the electrical apparatus, such as electrical motors and the like, and the mixture allowed to set. Heat may also be applied to hasten cure.

The resinous products may also be employed to prepare valuable foamed products. In this application the resinous products of the invention are preferably combined with the desired curing agents and foaming agents and others, such as thixotropic agents, pigments, stabilizing agents and the like that may be desired. This mixture may be foamed and cured by allowing to stand or by applying heat.

The products of the invention may also be employed to employ valuable adhesives and impregnating compositions. In utilizing the products for these applications it is generally desirable to combine them with the desired curing agent and any suitable solvent or diluent such as acrylonitrile, acetonitrile, crotonitrile, and desired fillers and stabilizers and then apply this mixture to the desired surface. Adhesive compositions prepared in this manner may be used to unite various surfaces such as wood-to-wood, metal-to-metal, resins-to-resins and the like. The adhesives may be allowed to set at room temperature or heat may be applied to hasten the cure.

To illustrate the manner in which the invention may be carried out, the following examples are given. It is understood, however, that the examples are for the purpose of illustration and the invention is not to be regarded as limited to any of the specific conditions cited therein.

EXAMPLE I 67 parts triglycidyl ester of trimerized linoleic acid and 33 parts polyether B were mixed with 20 parts of diethylene triamine and the mixture heated for four hours at 125° C. The resulting product had a tensile strength of 1813 p.s.i., ultimate elongation of 20%, a tear strength of 489 lbs./in. and a stiffness of 1470 p.s.i.

A composition prepared by curing the polyether B with 20 parts of diethylene triamine had an ultimate elongation of <4.0%. No tear strength and stiffness values were determined because the material was too rigid.

EXAMPLE II

A mixture of 67 parts diglycidyl ester of dimerized linoleic acid and 37 parts polyether B were combined with 17.6 parts of 2,5-dimethylpiperazine and the resulting mixture heated for four hours at 125° C. The resulting product had ultimate elongation of 120%, tensile strength of 1841 p.s.i. and a stiffness and inflexure of 568 p.s.i.

EXAMPLE III

A mixture of 67 parts of triglycidyl ester of trimerized linoleic acid and 33 parts of polyether B were combined with 5.6 parts of N-amino-ethylpiperazine and the resulting product cured for four hours at 125° C. The resulting product had good flexibility and strength.

EXAMPLE IV 2 parts of triglycidyl ester of trimerized linoleic acid and 1 part of polyether B were combined with 14 parts per 100 parts of resin of piperazine and the resulting product cured for four hours at 125° C. The resulting product had an ultimate elongation of 190% and a tensile strength of 3390 p.s.i.

EXAMPLE V 2 parts of triglycidyl ester of trimerized linoleic acid and 1 part of polyether B were combined with 57 parts per 100 parts of resin of an eicoasadienedioic-1-20 acid and the mixture heated for four hours at 125° C. The resulting product had an elongation of 370% and a tensile strength of 2180 p.s.i.

EXAMPLE VI 2 parts of diglycidyl ester of trimerized linoleic acid and 1 part of polyether B were combined with 11 parts of xylylenediamine per 100 parts of resin and the mixture heated for four hours at 125° C. The resulting product had good flexibility and strength.

EXAMPLE VII 2 parts of diglycidyl ether of dimerized linoleic acid and 1 part of polyether B were combined with 13 parts of N-(2-hydroxy-propyl)ethylene diamine per 100 parts of resin and the mixture heated for four hours at 125° C. The resulting product had an elongation of 103% and a tensile strength of 1673 p.s.i.

EXAMPLE VIII 9 parts of diglycidyl ester of dimerized linoleic acid and 1 part of polyether B were combined with 48 parts of methyl nadic anhydride per 100 parts of resin and the mixture heated for four hours at 125° C. The resulting product had good flexibility and strength.

EXAMPLE IX 67 parts of diglycidyl ester of dimerized linoleic acid and 33 parts polyether B were combined with 3.4 parts of diethylenetriamine and 6.0 parts of butylamine and the mixture heated for four hours at 125° C. The resulting product had an ultimate elongation of 10% and a tensile strength of 1240 p.s.i.

EXAMPLE X 67 parts of diglycidyl ester of dimerized linoleic acid and 33 parts polyether B were combined with 4.5 parts of diethylenetriamine and 15.6 parts of a $C_{12}$ long chain amine (Armeen 12–3) and the resulting mixture heated for four hours at 125° C. The resulting product had good flexibility and strength.

EXAMPLE XI 67 parts of diglycidyl ester of dimerized linoleic acid and 33 parts of polyether B were combined with 7.5 parts of xylylene diamine and 4.0 parts of butylamine. The resulting mixture was heated for four hours at 125°. The resulting product had an ultimate elongation of 114% and a tensile strength of 2054 p.s.i.

EXAMPLE XII 67 parts of a glycidyl ester of trimerized linoleic acid and 33 parts of a glycidyl polyether of 2,2-bis(4-hydroxyphenyl)propane having a mol weight of 900 and epoxy value of .20 eq./100 g. were heated and 6 parts of diethylene triamine added thereto. The resulting mixture was a hard, tough and flexible casting.

EXAMPLE XIII 70 parts of glycerol tri(8,9-epoxydodecanoate) and 30 parts of polyether B are combined with an equivalent amount of diethylene triamine. The resulting mixture is heated for 3 hours at 125° C. The resulting product is a hard tough and flexible casting.

Related results are obtained by replacing the glycerol tri(8,9-epoxydodecanoate) with equivalent amounts of each of the following: epoxidized soybean oil, epoxidized sardine oil and glycerol tri(10,11-epoxyoctadecanoate).

EXAMPLE XIV

Foamed products were prepared from compositions of the invention using nitrogen and Freon 22 as the foaming agents. Formulations were used as indicated below:

| | | |
|---|---|---|
| Polyether B | parts | 86 |
| Glycidyl ester of dimerized linoleic acid | do | 54 |
| Bentone 38[a] | do | 6 |
| N-aminoethylpiperazine | do | 23 |
| Nitrogen | p.s.i.g. | 150 |

| | | |
|---|---|---|
| Polyether B | parts | 33 |
| Glycidyl ester of dimerized linoleic acid | do | 67 |
| Bentone 38[a] | do | 6 |
| Pigment | do | 3 |
| Freon 22 | do | 10 |
| Zinc stearate | do | 0.5 |
| Diethylenetriamine | do | 10 |

[a] Dimethyldioctadecyl ammonium bentonite.

When cured at 75° C., the resulting foamed products had good strength and greatly improved flexibility over a foam prepared directly from polyether B.

EXAMPLE XV 75 parts of a mixture of di- and triglycidyl esters of dimerized and trimerized linoleic acid (made up of at least 70% of the trimer acid ester) and 25 parts of polyether B were combined and mixed with an equivalent amount of meta-phenylene diamine. This mixture was heated at 120° C., to give a hard tough but flexible product.

Related results are obtained by replacing polyether B with polyether A, polyether C and polyether D.

Related results are also obtained by replacing the m-phenylene diamine with equivalent amounts of each of the following: diethylene triamine, methylene dianiline, 2,6-diaminopyridine and diaminodiphenylsulfone.

I claim as my invention:

1. A composition comprising (1) a polyether polyepoxide and (2) at least 10% by weight of a glycidyl ester of a carboxylic acid containing from 12 to 70 carbon atoms.

2. A composition comprising (1) 10 parts to 90 parts by weight of a glycidyl polyether of a polyhydric compound of the group consisting of polyhydric phenols and polyhydric alcohols and (2) 90 parts to 10 parts by weight of a glycidyl ester of a polymerized long chain unsaturated fatty acid.

3. A composition as in claim 2 wherein the polymerized fatty acid is dimerized linoleic acid.

4. A composition as in claim 2 wherein the polymerized acid is trimerized linoleic acid.

5. A composition comprising 50 parts to 10 parts of a glycidyl polyether of a polyhydric phenol and 50 parts to 90 parts of a glycidyl ester of dimerized long chain unsaturated fatty acid.

6. A composition comprising 50 parts to 10 parts of a glycidyl polyether of a polyhydric phenol and 50 parts to 90 parts of a glycidyl ester of a trimerized long chain unsaturated fatty acid.

7. A composition comprising 20 parts to 30 parts of a glycidyl polyether of 2,2-bis(4-hydroxyphenyl)propane and 70 parts to 80 parts of a glycidyl polyester of a polymerized linoleic acid.

8. A composition comprising 25 parts of glycidyl polyether of 2,2-bis(4-hydroxyphenyl)propane and 75 parts of a mixture of glycidyl ester of dimerized and trimerized linoleic acid.

9. A foamed insoluble infusible flexible product obtained by heating the composition defined in claim 1 with a foaming agent and epoxy curing agent.

10. A foamed insoluble infusible flexible product obtained by heating the composition in claim 2 with a foaming agent and amine epoxy curing agent.

11. A foamed insoluble infusible flexible product obtained by heating the composition of claim 2 with a foaming agent and acid anhydride.

12. A foamed insoluble infusible flexible product obtained by heating the composition in claim 2 with a foaming agent and aliphatic polyamine.

13. A foamed insoluble infusible flexible product obtained by heating a composition defined in claim 8 with a foaming agent and diethylene triamine.

References Cited in the file of this patent

UNITED STATES PATENTS

| | | |
|---|---|---|
| 2,682,514 | Newey | June 29, 1954 |
| 2,682,515 | Naps | June 29, 1954 |